Jan. 7, 1964     C. B. CROSS ETAL     3,116,975
ARTIFICIAL GRAPHITE PROCESS
Filed Feb. 8, 1961
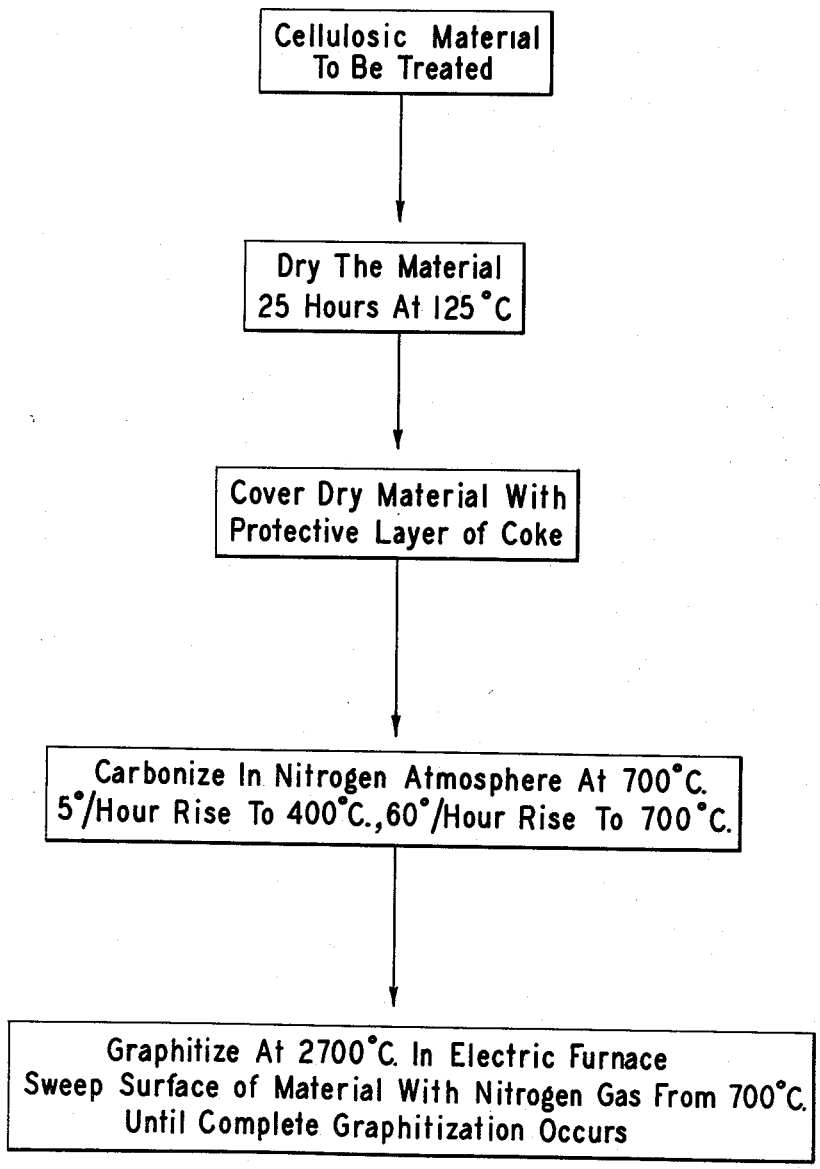
INVENTORS
CHESTER B. CROSS
DONALD R. ECKER
ORA L. STEIN
BY *Robert C. Cummings*
ATTORNEY

United States Patent Office 3,116,975
Patented Jan. 7, 1964

3,116,975
ARTIFICIAL GRAPHITE PROCESS
Chester B. Cross, Donald R. Ecker, and Ora L. Stein, Fostoria, Ohio, assignors to Union Carbide Corporation, a corporation of New York
Filed Feb. 8, 1961, Ser. No. 87,877
3 Claims. (Cl. 23—209.4)

This invention relates to a new and useful form of artificial graphite and more particularly to an improved method for its manufacture.

Graphite is a material which is a good conductor of heat and electricity, extremely resistant to high temperatures and also highly resistant to attack by most chemical reagents. Accordingly, graphite is an extremely important and useful material in industry in a great variety of applications.

Graphite appears in nature as one of the two naturally occurring forms of crystalline carbon, the other being diamond. Natural graphite occurs usually as a black soft mass or as crystals of a flaky structure.

In addition, graphite may be artificially manufactured. Almost all the artificial graphite which is made today is prepared according to the teaching first set forth by E. G. Acheson in 1896. Acheson's process, which was the first successful process for the commercial production of artificial graphite articles, has of course been somewhat modified since that time. Today, it is well known in the art that almost any amorphous carbon can be converted to a useful form of graphite in an electric furnace. As a general rule, however, artificial graphite articles are fabricated from either a lampblack or a petroleum coke base material.

Relatively small graphite articles such as electrical brush stock are usually made from a lampblack base. This process comprises intimately mixing raw lampblack with coal tar or pitch and briquetting the mixture. These briquettes are calcined at about 1000° C. in order to remove all volatiles and to pre-shrink the lampblack. Following the calcination, the briquettes are milled to a fine flour and mixed with a coal tar pitch binder. The resultant mixture is molded into the desired article which is initially baked at about 1000° C. to carbonize the binder, and finally baked at about 3000° C. in an electric furnace to graphitize the article.

Larger graphite articles such as electrodes for electric furnaces are generally made from petroleum coke base material. This process comprises calcining green petroleum coke to remove all volatiles, crushing the calcined material to a small particle size and finally milling a portion of this into a fine flour. The resultant particles and flour are blended to form an aggregate which is mixed with a pitch binder and extruded into the desired shape. The resultant shaped article is baked at about 1000° C. and is subsequently graphitized at 2500° C.–3000° C. in an electric furnace. Graphite electrodes so produced are routinely commercially available in sizes up to 40 inches in diameter.

When either of the above methods is followed, a shaped graphite article is produced or graphite stock is produced which may be shaped to the desired article by machining or other similar physical processes.

In addition to the above shaped artificial graphite articles, the prior art has also provided carbonaceous filaments for use in incandescent lighting. Thomas A. Edison prepared carbonized filaments for incandescent lighting purposes by dissolving good, clean commercial cotton or other natural cellulose in a solution of zinc chloride and squirting the resulting mass through a fluid hardener. The resulting filament was dried and carbonized by heating out of contact with air. Others taught immersing the filament of Edison in a hydrocarbon vapor and subsequently passing an electric current therethrough to raise it to a temperature sufficient to cause decomposition of the hydrocarbon or carbon compound and deposition of the same on the filament. W. R. Whitney improved such filaments by heating them at extreme temperatures in order to graphitize the deposit on the base filament.

Very recently artificial graphite, possessing all its attendant unique electrical, chemical, and mechanical properties, has become commercially available in the form of a textile material, such as graphite yarns and cloth. Such material, combining the unique properties of graphite with a flexible structure in a textile form, is useful in countless applications.

Research into the problems of the thermal conversion of flexible cellulosic textile material into flexible graphite has led to the completely unexpected discovery of two critical areas which may be generalized as raw material drying prior to carbonization of the material, and control of any evolving gases during graphitization of the material.

Cellulosic fibers normally contain about 10 percent to 20 percent absorbed water which is in equilibrium with the ambient humidity. The fibers may be dehydrated by heating, but unfortunately, upon cooling, the moisture is re-absorbed almost immediately. In fact, absorption is so rapid that it can be observed while weighing a dried sample of cloth in a closed analytical balance.

It has been determined that this absorbed moisture interferes with the production of flexible graphite in that it encourages the formation of tarry surface deposits on the individual filaments of the graphite. Upon further pyrolysis, these tarry deposits will decompose. As a result the individual filaments will stick together, particularly at any cross connections. Accordingly, a brittle, weak, product results.

The second critical area which was discovered to be important in the production of clean, flexible, graphite, textile material is control of any gases evolved from the material being treated at temperatures above 700° C. Normal electric furnace baking to 2700° C. for graphitization purposes, requires only enough neutral atmosphere to prevent penetration of air to the product. In large, conventional graphitizing furnaces, this is provided by a sacrificial carbonaceous packing material. In smaller furnaces, a blanket of nitrogen, argon, carbon monoxide or other neutral or reducing gas prevents oxygen attack.

Unexpectedly, in light of the above commonly practiced procedures, it was discovered that when such procedures were followed in the thermal conversion of cellulosic material to graphite, an undesirable graphite soot was deposited on the graphized material. This has been attributed to the fact that low molecular weight hydrocarbons, such as methane, are evolved from cellulose at temperatures above 700° C. These gases redeposit on the fibers as a graphite soot as a result of thermal cracking at higher temperatures. This soot will also cause individual filaments to stick to one another, particularly on cross connections of the material and thereby encourages the production of a weak, brittle product.

The principal object of the invention is to provide a novel process for the production of flexible graphite from cellulosic material which avoids the above discussed problems.

Broadly stated, the object of the invention is accomplished by a method which comprises the steps of placing the cellulosic material to be graphitized in a drying oven, drying said cellulosic material in said oven at a minimum temperature of about 100° C. for a minimum period of about 15 hours, shielding said dried material from the reabsorption of moisture, placing said dried material in a baking oven, covering said dried material with a protective layer of coke, carbonizing said material in said baking oven at about 700° C., and subsequently graphitizing said carbonized material in an electric furnace at about 2500° C. while continuously purging said furnace with a non-oxidizing and non-carbonaceous gas at temperatures above 700° C. until complete graphitization has occurred.

The invention will be more readily understood by reference to the accompanying drawing wherein the single FIGURE is a flow sheet which illustrates the preferred embodiment of the invention.

More specifically, the process of the invention avoids the absorbed moisture problem by drying the cellulosic material and subsequently baking it before any moisture is allowed to be re-absorbed. This may be conveniently accomplished by drying and baking in the same oven. The carbon-soot problem is overcome by the provision of an excess of a non-oxidizing and non-carbonaceous gas such as nitrogen, argon or helium which is used to purge the undesirable carbon bearing gases out of the electric graphitizing furnace before any undesirable pyrolytically deposited carbon can be formed. This purging is suitably carried out by impinging large volumes of the gas against the surface of the material.

Illustrative of the practice of the invention is the following example:

A plurality of sheets of cellulosic cloth were placed in a conventional gas fired baking oven and the oven was covered. The oven was heated to approximately 125° C. at a rate of 5° C. per hour, and held there for 20 hours' total drying time. The oven was opened immediately upon completion of the drying cycle, and the cellulosic material was covered with a protective layer of coke. The oven was again covered and the temperature thereof was raised to about 700° C., at a rate of about 5°/hour to 400° C. and 60°/hour to 700° C. to carbonize the cellulosic material. Nitrogen flow through the oven was supplied for additional oxidation protection. Upon cooling of the oven, the carbonized material was removed and transferred to an electric furnace for graphitization. The carbonized material was graphitized in the electric furnace at a temperature of 2700° C., while the surface of the material was continuously swept with nitrogen gas at all times that the temperature was above 700° C., until complete graphitization occurred.

When similar cellulosic cloth was identically treated except for no initial drying period and no nitrogen sweeping of the surface during graphitization, a weak, brittle product resulted.

The term cellulosic material as used herein and in the appended claims refers to all natural cellulosic forms (cotton, linen, jute, etc.) and all regenerated cellulosic forms (rayon, acetate, etc.).

In addition, the process of the invention is not intended to be limited to the treatment of cellulosic cloth, but applies equally to batting, felts, yarns, and loose fibers.

We claim:

1. In a process for graphitizing flexible carbonaceous material by subjecting said material to graphitizing temperatures in a graphitizing furnace, said flexible carbonaceous material being carbonized flexible cellulosic textile material; the improvement which comprises continuously purging said furnace with a non-oxidizing and non-carbonaceous gas, said purging gas being impinged in large volumes in a sweeping manner against the surface of said material being graphitized, at all times that said temperature is above about 700° C. until complete graphitization thereof has occurred.

2. The process of claim 1 wherein said cellulosic textile material is rayon cloth.

3. The process of claim 2 wherein said non-oxidizing, non-carbonaceous gas is nitrogen.

References Cited in the file of this patent

UNITED STATES PATENTS

| 1,411,537 | Sullivan | Apr. 4, 1922 |
| 1,827,931 | Blankenstein | Oct. 20, 1931 |
| 3,011,981 | Soltes | Dec. 5, 1961 |

FOREIGN PATENTS

| 14,850 | Great Britain | Jan. 5, 1959 |
| 1,180,862 | France | Jan. 5, 1959 |